United States Patent
Oyler et al.

(10) Patent No.: US 7,943,555 B2
(45) Date of Patent: May 17, 2011

(54) WELLBORE TREATMENT KITS FOR FORMING A POLYMERIC PRECIPITATE TO REDUCE THE LOSS OF FLUID TO A SUBTERRANEAN FORMATION

(75) Inventors: Kenneth W. Oyler, Baytown, TX (US); Carl J. Thaemlitz, Katy, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 33 days.

(21) Appl. No.: 11/109,150

(22) Filed: Apr. 19, 2005

(65) Prior Publication Data
US 2006/0234875 A1    Oct. 19, 2006

(51) Int. Cl.
*C09K 8/42*    (2006.01)
*E21B 43/25*   (2006.01)

(52) U.S. Cl. ........ 507/229; 507/242; 507/243; 507/244; 507/261; 507/263; 507/265; 507/266; 507/267; 507/268; 166/294; 166/295; 175/64

(58) Field of Classification Search ................... None
See application file for complete search history.

(56) References Cited

U.S. PATENT DOCUMENTS

| | | | |
|---|---|---|---|
| 2,146,693 A | 2/1939 | Vietti et al. | 255/1 |
| 2,165,823 A | 7/1939 | Vietti et al. | 255/1 |
| 2,205,609 A | 6/1940 | Vail et al. | 255/1 |
| 2,294,078 A | 8/1942 | Dow et al. | 166/22 |
| 2,990,016 A | 6/1961 | Goins, Jr. et al. | 166/293 |
| 3,025,234 A | 3/1962 | Canterino | 252/8.5 |
| 3,196,122 A | 7/1965 | Evans | |
| 3,235,490 A | 2/1966 | Goren | 210/52 |
| 3,252,904 A | 5/1966 | Carpenter | 252/8.55 |
| 3,336,979 A * | 8/1967 | Ingraham et al. | 166/283 |
| 3,350,366 A | 10/1967 | Merijan | |
| 3,359,225 A | 12/1967 | Weisend | 260/29.6 |
| 3,380,529 A | 4/1968 | Hendrickson | |
| 3,396,790 A * | 8/1968 | Eaton | 166/270 |

(Continued)

FOREIGN PATENT DOCUMENTS
EP    0 188 856    7/1986

(Continued)

OTHER PUBLICATIONS

Halliburton brochure entitled "Accolade™ Drilling Fluid Exceeds New GOM Environmental Standards and Boosts Performance" dated 2002.

(Continued)

*Primary Examiner* — John J Figueroa
(74) *Attorney, Agent, or Firm* — Craig W. Roddy; McDermott, Will & Emergy

(57) ABSTRACT

Wellbore treatment kits are provide that include a polymeric solution for placement in a wellbore that penetrates a subterranean formation and an activator for causing a polymer to precipitate out of the polymeric solution when it contacts the polymeric solution, wherein the resulting precipitate is capable of at least partially blocking a flow of a wellbore servicing fluid into the subterranean formation. The wellbore servicing fluid may be, for example, a drilling fluid, a cement composition, a workover fluid, or combinations thereof. The polymeric solution may comprise, for example, a poly vinyl pyrrolidone aqueous solution, and the activator may comprise, for example, a formate brine. When desirable, the precipitate may be easily and quickly removed from the subterranean formation by dissolving it in fresh water.

19 Claims, 1 Drawing Sheet

U.S. PATENT DOCUMENTS

| | | | |
|---|---|---|---|
| 3,397,744 A | 8/1968 | Hort et al. | |
| 3,434,971 A * | 3/1969 | Atkins | 507/225 |
| 3,504,746 A | 4/1970 | Frefield et al. | |
| 3,554,287 A | 1/1971 | Eilers et al. | 166/293 |
| 3,617,095 A | 11/1971 | Lissant | 406/197 |
| 3,623,554 A * | 11/1971 | Pence, Jr. | 166/293 |
| 3,640,343 A | 2/1972 | Darley | 166/292 |
| 3,679,001 A | 7/1972 | Hill | 166/292 |
| 3,738,437 A | 6/1973 | Scheuerman | 175/70 |
| 3,746,109 A | 7/1973 | Darley | 175/66 |
| 3,843,524 A | 10/1974 | Perricone et al. | 252/1 |
| 3,915,232 A * | 10/1975 | Gruesbeck et al. | 166/295 |
| 3,915,323 A | 10/1975 | Underhill | 414/462 |
| 3,924,684 A | 12/1975 | Tate | |
| 3,927,717 A | 12/1975 | Tate | |
| 3,934,651 A | 1/1976 | Nierode et al. | 166/282 |
| 3,956,145 A | 5/1976 | Christopher, Jr. et al. | 507/212 |
| 3,976,140 A | 8/1976 | Shaughnessy et al. | |
| 4,018,286 A | 4/1977 | Gall et al. | |
| 4,033,893 A | 7/1977 | Mondshine | 252/8.5 A |
| 4,039,029 A | 8/1977 | Gall | 166/294 |
| 4,042,529 A | 8/1977 | Nimerick et al. | 252/363.5 |
| 4,045,357 A | 8/1977 | Redd | 252/8.5 A |
| 4,079,011 A | 3/1978 | Tate | |
| 4,098,337 A | 7/1978 | Argabright et al. | |
| 4,141,416 A * | 2/1979 | Holm | 166/270.1 |
| 4,142,595 A | 3/1979 | Anderson et al. | 175/72 |
| 4,235,728 A | 11/1980 | Schulz et al. | |
| 4,302,341 A * | 11/1981 | Watson | 507/204 |
| 4,343,363 A | 8/1982 | Norton et al. | 166/281 |
| 4,353,806 A | 10/1982 | Canter et al. | 507/229 |
| 4,360,061 A | 11/1982 | Canter et al. | 166/270.1 |
| 4,391,643 A | 7/1983 | Murphey | 106/74 |
| 4,405,357 A | 9/1983 | Chang | |
| 4,440,649 A | 4/1984 | Loftin et al. | 252/8.5 C |
| 4,440,653 A | 4/1984 | Briscoe et al. | 507/202 |
| 4,460,627 A | 7/1984 | Weaver et al. | 427/212 |
| 4,466,831 A | 8/1984 | Murphey | 106/74 |
| 4,486,316 A | 12/1984 | Carriere et al. | |
| 4,488,601 A | 12/1984 | Hammett | 166/270.1 |
| 4,490,261 A | 12/1984 | Heilweil | 252/8.5 A |
| 4,498,540 A * | 2/1985 | Marrocco | 166/295 |
| 4,498,994 A | 2/1985 | Heilweil | 252/8.5 M |
| 4,514,310 A | 4/1985 | Heilweil | 252/8.55 R |
| 4,521,136 A | 6/1985 | Murphey | 405/263 |
| 4,525,285 A | 6/1985 | Son et al. | 252/8.5 M |
| 4,532,052 A | 7/1985 | Weaver et al. | 252/8.55 R |
| 4,536,297 A | 8/1985 | Loftin | 252/8.5 C |
| 4,536,303 A | 8/1985 | Borchardt | 507/222 |
| 4,588,032 A | 5/1986 | Weigand et al. | 166/291 |
| 4,625,802 A | 12/1986 | Sydansk | 166/292 |
| 4,627,495 A | 12/1986 | Harris et al. | 166/280.1 |
| 4,644,020 A | 2/1987 | Stahl | 522/79 |
| 4,659,750 A | 4/1987 | Sedillo et al. | 523/130 |
| 4,664,816 A | 5/1987 | Walker | |
| 4,674,574 A | 6/1987 | Savoly et al. | 166/293 |
| 4,740,319 A | 4/1988 | Patel et al. | 252/8.515 |
| 4,741,843 A | 5/1988 | Garvey et al. | 252/8.514 |
| 4,757,862 A | 7/1988 | Naiman et al. | 166/295 |
| 4,773,481 A | 9/1988 | Allison et al. | 166/270 |
| 4,792,412 A * | 12/1988 | Heilweil | 507/123 |
| 4,825,950 A | 5/1989 | Kalpakci et al. | 166/270.1 |
| 4,891,223 A | 1/1990 | Ambegaonkar et al. | 424/408 |
| 4,941,981 A | 7/1990 | Perricone et al. | 252/8.51 |
| 4,951,921 A | 8/1990 | Stahl et al. | 166/270 |
| 4,988,450 A | 1/1991 | Wingrave et al. | 252/8.514 |
| 5,030,366 A | 7/1991 | Wilson et al. | 507/228 |
| 5,035,812 A | 7/1991 | Aignesberger et al. | 252/8.51 |
| 5,039,433 A | 8/1991 | Sopko et al. | 507/226 |
| 5,080,809 A | 1/1992 | Stahl et al. | 507/221 |
| 5,111,886 A | 5/1992 | Dovan et al. | 166/300 |
| 5,161,615 A | 11/1992 | Hutchins et al. | 166/295 |
| 5,186,257 A | 2/1993 | Stahl et al. | 166/270.1 |
| 5,196,143 A | 3/1993 | Burba, III et al. | |
| 5,198,353 A * | 3/1993 | Hawkins et al. | 435/188 |
| 5,198,415 A | 3/1993 | Steiger | 507/103 |
| 5,208,216 A | 5/1993 | Williamson et al. | 507/120 |
| 5,211,250 A | 5/1993 | Kubena, Jr. et al. | 175/72 |
| 5,226,480 A | 7/1993 | Dovan et al. | 166/300 |
| 5,259,994 A | 11/1993 | Welch et al. | |
| 5,291,949 A | 3/1994 | Dovan et al. | 166/295 |
| 5,346,550 A | 9/1994 | Kunzi et al. | 106/709 |
| 5,382,371 A | 1/1995 | Stahl et al. | 507/221 |
| 5,383,521 A | 1/1995 | Onan et al. | 166/293 |
| 5,447,198 A | 9/1995 | Kunzi et al. | 166/293 |
| 5,458,195 A | 10/1995 | Totten et al. | 166/293 |
| 5,472,051 A | 12/1995 | Brothers | 166/293 |
| 5,536,311 A | 7/1996 | Rodrigues | 106/724 |
| 5,569,324 A | 10/1996 | Totten et al. | 106/696 |
| 5,620,947 A * | 4/1997 | Elward-Berry | 507/229 |
| 5,634,984 A | 6/1997 | Van Slyke | 134/40 |
| 5,635,458 A | 6/1997 | Lee et al. | 507/240 |
| 5,654,261 A | 8/1997 | Smith | 507/269 |
| 5,662,168 A | 9/1997 | Smith | 166/295 |
| 5,708,107 A | 1/1998 | Ahmed et al. | 526/263 |
| 5,711,376 A | 1/1998 | Sydansk | 166/308.6 |
| 5,723,423 A | 3/1998 | Van Slyke | 510/188 |
| 5,780,407 A | 7/1998 | Van Slyke | 510/188 |
| 5,783,527 A | 7/1998 | Dobson et al. | |
| 5,788,781 A | 8/1998 | Van Slyke | 134/40 |
| 5,855,244 A | 1/1999 | Ahmed et al. | 166/295 |
| 5,866,517 A | 2/1999 | Carpenter et al. | 507/226 |
| 5,874,111 A | 2/1999 | Maitra et al. | 424/499 |
| 5,883,210 A | 3/1999 | Ahmed et al. | 526/263 |
| 5,912,221 A | 6/1999 | Van Leeuwen et al. | |
| 5,913,364 A | 6/1999 | Sweatman | 166/281 |
| 5,922,653 A | 7/1999 | Ahmed et al. | 507/242 |
| 5,945,387 A | 8/1999 | Chatterji et al. | 507/224 |
| 5,968,879 A | 10/1999 | Onan et al. | 507/202 |
| 6,012,524 A | 1/2000 | Chatterji et al. | 166/295 |
| 6,030,928 A | 2/2000 | Stahl et al. | 507/121 |
| 6,051,670 A | 4/2000 | Ahmed et al. | 526/263 |
| 6,054,416 A | 4/2000 | Bland | 507/136 |
| 6,059,035 A | 5/2000 | Chatterji et al. | 166/293 |
| 6,060,434 A | 5/2000 | Sweatman et al. | 507/216 |
| 6,090,762 A | 7/2000 | Clapperton et al. | 510/108 |
| 6,167,967 B1 | 1/2001 | Sweatman et al. | 166/281 |
| 6,176,315 B1 | 1/2001 | Reddy et al. | 166/295 |
| 6,177,396 B1 | 1/2001 | Clapperton et al. | 510/405 |
| 6,180,689 B1 | 1/2001 | Moulin | |
| 6,196,317 B1 | 3/2001 | Hardy | 166/295 |
| 6,204,224 B1 | 3/2001 | Quintero et al. | 507/123 |
| 6,248,698 B1 | 6/2001 | Mullen et al. | 507/140 |
| 6,291,405 B1 | 9/2001 | Lee et al. | 507/136 |
| 6,364,016 B1 | 4/2002 | Dalrymple et al. | 166/270 |
| 6,380,136 B1 | 4/2002 | Bates et al. | 507/90 |
| 6,419,981 B1 | 7/2002 | Novich et al. | 427/180 |
| 6,422,325 B1 | 7/2002 | Kriegar | 175/50 |
| 6,423,517 B2 | 7/2002 | Becker et al. | 435/187 |
| 6,431,280 B2 * | 8/2002 | Bayliss et al. | 166/263 |
| 6,435,276 B1 | 8/2002 | Kercheville et al. | 166/255.1 |
| 6,451,743 B1 | 9/2002 | Fox | 507/110 |
| 6,497,283 B1 | 12/2002 | Eoff et al. | 166/293 |
| 6,497,383 B1 | 12/2002 | Daul et al. | |
| 6,579,832 B2 | 6/2003 | Jimenez et al. | 507/143 |
| 6,586,371 B1 | 7/2003 | Maroy et al. | 507/120 |
| 6,610,810 B2 | 8/2003 | Phillips et al. | 527/201 |
| 6,615,918 B2 | 9/2003 | Bayliss et al. | |
| 6,642,183 B1 | 11/2003 | Bass et al. | 507/129 |
| 6,656,266 B1 | 12/2003 | Barlet-Gouderd et al. | |
| 6,656,989 B1 | 12/2003 | Benton et al. | 524/394 |
| 6,702,044 B2 | 3/2004 | Reddy et al. | 175/64 |
| 6,703,351 B2 | 3/2004 | Stowe, II et al. | 507/117 |
| 6,716,799 B1 | 4/2004 | Mueller et al. | 507/138 |
| 6,743,288 B2 | 6/2004 | Eoff et al. | 106/724 |
| 6,770,604 B2 | 8/2004 | Reddy et al. | 507/224 |
| 6,822,061 B2 | 11/2004 | Eoff et al. | 526/287 |
| 6,823,940 B2 | 11/2004 | Reddy et al. | 166/295 |
| 6,837,316 B2 | 1/2005 | Reddy et al. | 175/64 |
| 6,838,082 B2 * | 1/2005 | Growcock et al. | 424/93.7 |
| 6,838,417 B2 | 1/2005 | Bouwmeester et al. | 507/203 |
| 6,843,841 B2 | 1/2005 | Reddy et al. | 106/162.2 |
| 6,861,393 B2 | 3/2005 | Temple et al. | 507/199 |
| 6,877,563 B2 | 4/2005 | Todd et al. | 166/312 |
| 6,955,220 B2 | 10/2005 | Maberry et al. | |
| 7,032,669 B2 | 4/2006 | Chatterji et al. | 166/300 |
| 7,033,975 B2 | 4/2006 | Baran, Jr. et al. | 507/102 |

| | | |
|---|---|---|
| 7,087,554 B2 | 8/2006 | Youngson et al. ............ 507/123 |
| 7,276,249 B2 | 10/2007 | Ryde et al. |
| 7,320,802 B2 | 1/2008 | Ryde et al. |
| 7,348,365 B2 | 3/2008 | Lee et al. |
| 7,488,705 B2 | 2/2009 | Reddy et al. |
| 7,605,112 B2 | 10/2009 | Orton et al. |
| 7,781,049 B2 | 8/2010 | Apte et al. |
| 7,786,049 B2 | 8/2010 | Temple et al. |
| 7,833,945 B2 | 11/2010 | Harrower et al. |
| 7,905,287 B2 | 3/2011 | Oyler et al. |
| 2002/0012675 A1 | 1/2002 | Jain et al. |
| 2002/0149656 A1 | 10/2002 | Nohr et al. ....................... 347/95 |
| 2002/0160919 A1 | 10/2002 | Stowe, II et al. |
| 2003/0008778 A1 | 1/2003 | Donaldson et al. ........... 507/100 |
| 2003/0064897 A1 | 4/2003 | Kirnser et al. ................. 507/100 |
| 2003/0114317 A1 | 6/2003 | Benton et al. ................. 507/200 |
| 2003/0144153 A1 | 7/2003 | Krisner et al. ................ 507/100 |
| 2003/0234103 A1* | 12/2003 | Lee et al. ....................... 166/293 |
| 2004/0043905 A1 | 3/2004 | Miller et al. .................. 507/100 |
| 2004/0050589 A1 | 3/2004 | Head |
| 2004/0106525 A1 | 6/2004 | Willberg et al. |
| 2004/0110644 A1 | 6/2004 | Halliday et al. ............. 507/100 |
| 2004/0132625 A1 | 7/2004 | Halliday et al. ............. 507/100 |
| 2004/0204323 A1 | 10/2004 | Temple et al. ................. 507/100 |
| 2004/0229755 A1 | 11/2004 | Thaemlitz ..................... 507/121 |
| 2004/0235674 A1 | 11/2004 | Youngson et al. ............ 507/123 |
| 2005/0006305 A1 | 1/2005 | Juby et al. |
| 2005/0032652 A1 | 2/2005 | Kirnser et al. ................. 507/100 |
| 2006/0116294 A1 | 6/2006 | Xiang et al. ................... 507/117 |
| 2006/0231255 A1 | 10/2006 | Oyler et al. .................... 166/295 |
| 2006/0234875 A1 | 10/2006 | Oyler et al. .................... 507/219 |
| 2007/0015668 A1 | 1/2007 | Harrower et al. |

FOREIGN PATENT DOCUMENTS

| | | |
|---|---|---|
| EP | 0 668 339 A1 | 2/1995 |
| GB | 1085046 | 2/1964 |
| GB | 1082046 | 9/1967 |
| GB | 2 267 921 A | 12/1993 |
| WO | WO 96/03474 A2 | 2/1996 |
| WO | WO 96/04348 | 2/1996 |
| WO | WO96/04348 A1 | 2/1996 |
| WO | WO 97/05212 | 2/1997 |
| WO | WO02/087749 A1 | 11/2002 |
| WO | WO 2004/090067 A2 | 10/2004 |
| WO | WO 2005/078047 A1 | 8/2005 |
| WO | WO 2006/111703 | 10/2006 |
| WO | WO 2006/111708 | 10/2006 |
| WO | WO 2007/010212 | 1/2007 |

OTHER PUBLICATIONS

Patent Application entitled "Methods of Using A Polymeric Precipitate to Reduce The Loss of Fluid to a Subterranean Formation" by Kenneth W. Oyler et al., filed Apr. 19, 2005, as U.S. Appl. No. 11/109,354.
Office action from U.S. Appl. No. 11/109,354 dated Aug. 29, 2006.
Baker Hughes Drilling Fluids, "Water Based Fluids: MAX-SHIELD," available at http://www.bakerhughes.com/DrillingFluids/water_based_fluids/maxshield.htm, 2006.
Baker Hughes Drilling Fluids, "Safety Data Sheet: MAX-SHIELD", Oct. 27, 2004.
Dye, Billy et al., "Design Considerations for High Performance Water-Based Muds," *American Association of Drilling Engineers*, AADE-04-DF-HO-14, Apr. 2004.
Baker Hughes Drilling Fluids, Material Safety Data Sheet: PERFORMAX™, Nov. 13, 2003.
U.S. Appl. No. 11/183,122, filed Jul. 15, 2005, Youngson et al.
U.S. Appl. No. 11/183,113, filed Jul. 15, 2005, Youngson et al.
U.S. Appl. No. 11/109,354, filed Apr. 19, 2005, Oyler et al.
Baroid brochure entitled "BARACAT® Shale Stabilizer" dated 2002.
Baroid brochure entitled "BARASIL™—S Shale Stabilizer" dated 2002.
Baroid brochure entitled "BARO-TROL® Plus" dated 2000.
Baroid brochure entitled CLAYSEAL® Shale Stabilizer dated 2002.
Baroid brochure entitled "EZ-MUD® Shale Stabilizer" dated 2002.
Baroid brochure entitled "GEM™ 2000 Shale Stabilizer" dated 2002.
Baroid brochure entitled "HYDRO-GUARD™ Inhibitive Water-Based Fluid" date Sep. 2002.
Hood, David et al., "Structural Insights Into a Novel Molecular-Scale Composite of Soluble Poly(vinyl pyrrolidone) Supporting Uniformly Dispersed Nanoscale Poly(vinyl pyrrolidone) Particles" dated Sep. 23, 2002.
Nesbitt, L.E. et al., "Shale Stabilization Principles" SPE 14248, dated Sep. 1985.
International Specialty Products brochure entitled "New ViviPrint™ Technology Commercially Available" dated 2002.
Zyvek brochure entitled "Nanotechnology" by Christine Peterson, undated.
Kodak brochure entitled "Nanoparticles and You—Chances are You've Got Them" dated 2001.
Poehlein, Gary "Connection to Other Fields; Education Issues," dated 1998.
Office Action from U.S. Appl. No. 11/109,354 dated Mar. 8, 2007.
Office Action from U.S. Appl. No. 10/411,015, Nov. 1, 2005.
Office Action from U.S. Appl. No. 10/411,015, Apr. 20, 2005.
Office Action from U.S. Appl. No. 10/776,887, Mar. 5, 2007.
Office Action from U.S. Appl. No. 10/776,887, Sep. 6, 2006.
Office Action from U.S. Appl. No. 10/776,887, May 22, 2006.
U.S. Appl. No. 10/776,887, filed Feb. 11, 2004, Temple et al.
Office Action from U.S. Appl. No. 11/109,354, Dec. 12, 2007.
Notice of Allowance in U.S. Appl. No. 11/411,015, Apr. 21, 2006.
Office Action from U.S. Appl. No. 10/776,887, Feb. 6, 2008.
Office Action from U.S. Appl. No. 10/776,887, Aug. 23, 2007.
Office Action from U.S. Appl. No. 11/183,113, Feb. 6, 2008.
Office Action from U.S. Appl. No. 11/183,122, Feb. 6, 2008.
Foreign Communication from a Related Counterpart Application—PCT/GB2005/000411, Jun. 1, 2005.
Foreign Communication from a Related Counterpart Application—PCT/GB2005/000411, Aug. 14, 2006.
Foreign Communication from a Related Counterpart Application—PCT/GB2004/001563, Dec. 21, 2004.
Foreign Communication from a Related Counterpart Application—PCT/GB2004/001563, Sep. 13, 2004.
Foreign Communication from a Related Counterpart Application—PCT/GB2006/002622, Sep. 25, 2006.
Foreign Communication from a Related Counterpart Application—PCT/GB2006/002622, Jan. 16, 2008.
Foreign Communication from a Related Counterpart Application—EP 05 702 136.2, May 29, 2007.
Foreign Communication from a Related Counterpart Application—PCT/GB2006/001286, Oct. 23, 2007.
Foreign Communication from a Related Counterpart Application—PCT/GB2006/001286, Jun. 16, 2006.
Foreign Communication from a Related Counterpart Application—PCT/GB2006/001244, Oct. 23, 2007.
Foreign Communication from a Related Counterpart Application—PCT/GB2006/001244, Dec. 28, 2006.
Office Action mailed Oct. 9, 2008, for U.S. Appl. No. 11/183,113.
Office Action mailed Jul. 29, 2008 from U.S. Appl. No. 11/109,354.
Office Action mailed Aug. 11, 2008 from U.S. Appl. No. 10/776,887.
Office Action dated Oct. 30, 2008, for U.S. Appl. No. 11/183,122.
Office for related application, U.S. Appl. No. 11/109,354, Jul. 29, 2008.
Office Action for U.S. Appl. No. 11/109,354, dated Mar. 24, 2009.
Office Action for U.S. Appl. No. 10/776,887 dated May 11, 2009.
Office Action for U.S. Appl. No. 11/183,122, dated Jun. 15, 2009.
Office Action for U.S. Appl. No. 11/183,122, dated Oct. 1, 2009.
Definition of "Clay", Hawley's Condensed Chemical Dictionary, 14th Edition, Knovel, publisher, Richard J. Lewis Sr., editor, 2002; pp. Title and "Clay."
Office Action for U.S. Appl. No. 10/776,887 dated Jan. 5, 2010.
ViviPrint: Products for Digital Printing & Imaging; International Specialty Products; pp. 1-11; 2006.
Office Action for U.S. Appl. No. 11/183,122 dated Mar. 16, 2010.
European Office Action for Patent Application No. EP 06 764 969.9 dated Apr. 30, 2010.

Office Action for U.S. Appl. No. 11/109,354 dated Apr. 23, 2010.
Office Action for U.S. Appl. No. 10/776,887 dated Apr. 15, 2010.
Office Action for U.S. Appl. No. 11/109,354 dated Sep. 2, 2010.
Notice of Allowance and Notice of Allowability for U.S. Appl. No. 10/776,887 dated Jun. 28, 2010.
Supplemental Notice of Allowability for U.S. Appl. No. 10/776,887 dated Jul. 2, 2010.
Notice of Alowance for U.S. Appl. No. 11/183,122 dated Sep. 23, 2010.

* cited by examiner

WELLBORE TREATMENT KITS FOR FORMING A POLYMERIC PRECIPITATE TO REDUCE THE LOSS OF FLUID TO A SUBTERRANEAN FORMATION

FIELD OF THE INVENTION

The present invention generally relates to downhole operations, and more particularly to wellbore treatment kits for forming a polymeric precipitate in a subterranean formation to reduce the loss of fluid to the formation.

BACKGROUND OF THE INVENTION

The following paragraphs contain some discussion, which is illuminated by the innovations disclosed in this application, and any discussion of actual or proposed or possible approaches in this Background section does not imply that those approaches are prior art.

Natural resources such as oil or gas residing in a subterranean formation can be recovered via the formation of wells that penetrate the formation. In particular, a wellbore is typically drilled down to the formation while circulating a drilling fluid (also known as a drilling mud) through the wellbore. During the drilling process, the drill bit generates drill cuttings that consist of small pieces of shale and rock. The drilling fluid carries the drill cuttings in a return flow stream back to the well drilling platform. After terminating the circulation of the drilling fluid, a string of pipe, e.g., casing, is run into the wellbore. The drilling fluid is then usually circulated downwardly through the interior of the pipe and upwardly through the annulus, which is located between the exterior of the pipe and the walls of the well bore.

Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., cementing operations occurring after the primary cementing operation, may also be performed. One example of a secondary cementing operation is squeeze cementing whereby a cement slurry is forced under pressure to areas of lost integrity in the annulus to seal off those areas.

Unfortunately, the fluids used in such downhole operations may be lost to the subterranean formation while circulating the fluids in the wellbore. In particular, the fluids may enter the subterranean formation via depleted zones, zones of relatively low pressure, naturally occurring fractures, weak zones having fracture gradients exceeded by the hydrostatic pressure of the drilling fluid, and so forth. As a result, the services provided by the fluids are more difficult to achieve. For example, a problem known as lost circulation may occur in which the circulation of the drilling fluid in the wellbore drops due to it being lost to the formation. Its circulation may eventually become too low to allow for further drilling of the wellbore. Also, a cement slurry may be lost to the formation as it is being placed in the annulus, thereby rendering it ineffective in isolating the adjacent subterranean formation. In particular, the amount of cement slurry may be insufficient to fill the annulus from top to bottom during primary cementing or to fill areas of lost integrity in a pre-existing cement column during secondary cementing. Further, dehydration of the cement slurry may result, compromising the strength of the cement that forms in the annulus.

Traditional methods of overcoming the problems described above include sealing the zones through which the fluids can enter the subterranean formation with thixotropic cements, non-aqueous dispersions of clays, sodium silicate solutions in combination with calcium salt sweeps, and fluids containing inert platelets such as mica. However, the presence of such sealants in the formation may block the flow of oil or gas into the wellbore when it is desirable to begin production. Further, those materials may contaminate fresh water produced by the formation ahead of the oil or gas. Unfortunately, the sealants typically cannot be easily removed from the formation before production. A need therefore exists to develop a way to prevent the loss of fluid to the subterranean formation without adversely affecting the production of water, oil, or gas by the formation.

SUMMARY OF THE INVENTION

Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

In embodiments, wellbore treatment kits comprising: a polymeric solution for placement in a wellbore that penetrates a subterranean formation; and an activator for causing a polymer to precipitate out of the polymeric solution when it contacts the polymeric solution, wherein the resulting precipitate is capable of at least partially blocking a flow of a wellbore servicing fluid into the subterranean formation. The wellbore servicing fluid may be, for example, a drilling fluid, a cement composition, a workover fluid, or combinations thereof. The polymeric solution may comprise, for example, a poly vinyl pyrrolidone aqueous solution, and the activator may comprise, for example, a formate brine. When desirable, the precipitate may be easily and quickly removed from the subterranean formation by dissolving it in fresh water.

In other embodiments, wellbore treatment kits comprise: a polymeric solution for placement in a wellbore that penetrates a subterranean formation; an activator for causing a polymer to precipitate out of the polymeric solution when it contacts the polymeric solution, wherein the resulting precipitate is capable of at least partially blocking a flow of a wellbore servicing fluid into the subterranean formation; and a spacer for separating the polymeric solution and the activator when they are pumped into the wellbore.

In additional embodiments, subterranean wells comprise a precipitate disposed therein for at least partially blocking a flow of a wellbore servicing fluid into a subterranean formation penetrated by the well. The precipitate may comprise polyvinylpyrrolidone that has been precipitated out of water. The precipitate may be capable of being dissolved in water for removing the precipitate from the subterranean well.

DETAILED DESCRIPTION OF THE PREFERRED EMBODIMENTS

Figures 1A, 1B:
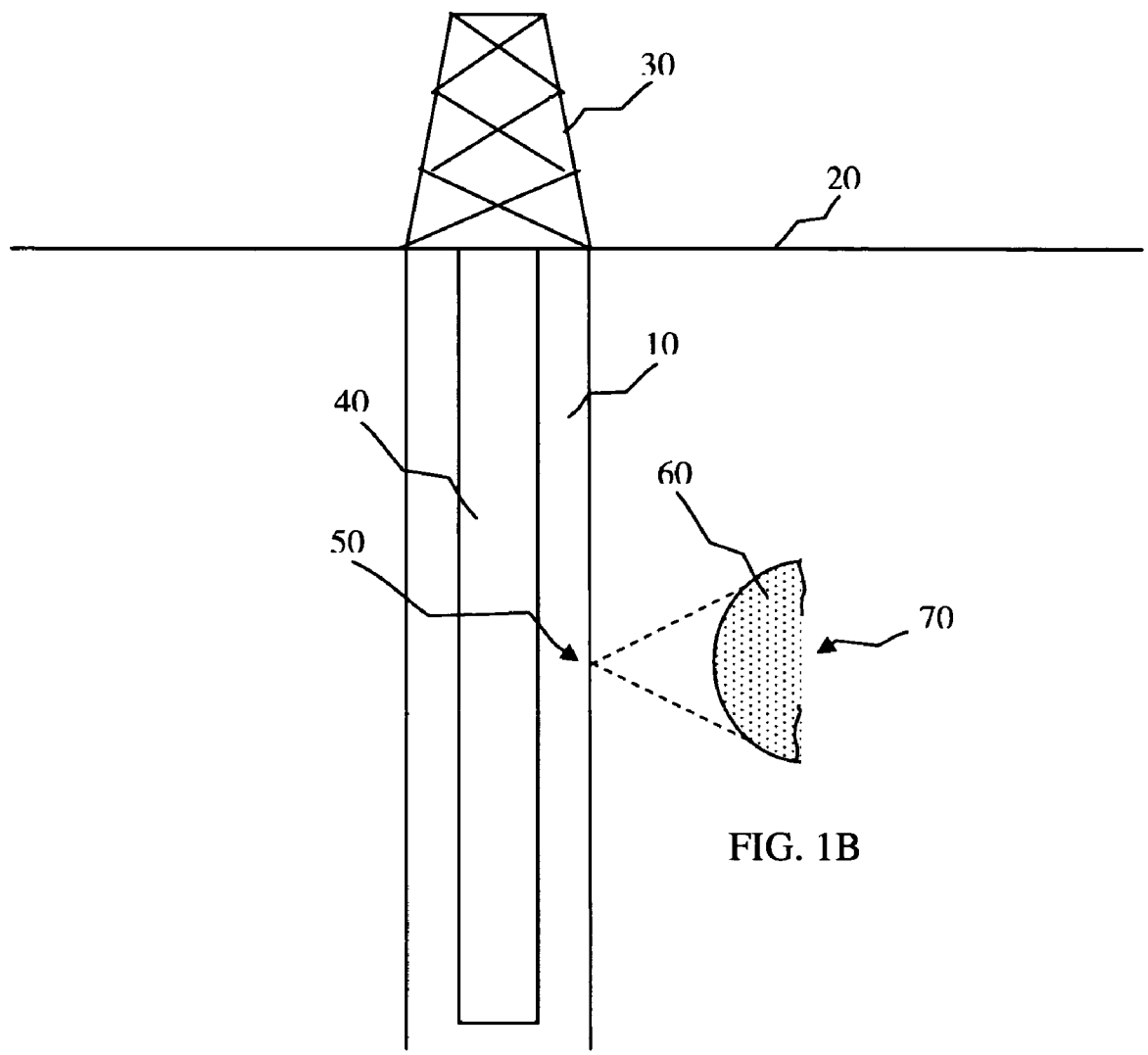
FIG. 1A is a side plan view of a drilling rig and a wellbore in the earth for recovering oil from a subterranean formation.
FIG. 1B is a detailed view of a section of the wellbore depicted in FIG. 1A, showing a precipitate blocking a flow pathway into the subterranean formation.

A polymeric solution and an activator may be contacted in a subterranean formation in such a manner as to form a hard precipitate in the formation. As used herein, a "polymeric solution" is defined as a solution comprising a polymer, an oligomer, or combinations thereof. As used herein, an "activator" is defined as a material that, when present in a sufficient amount, can cause the polymer and/or oligomer to precipitate out of the solution, wherein the activator may be a liquid in which the polymer and/or oligomer is insoluble. It is understood that "subterranean formation" encompasses both areas below exposed earth or areas below earth covered by water such as sea or ocean water. The resulting polymeric precipitate is typically impermeable to fluid and thus may form a barrier in the formation that at least partially blocks one or more flow pathways through which a fluid could undesirably migrate into the formation. Examples of such flow pathways include natural or induced fractures, depleted zones, zones of relatively low pressure, weak zones having fracture gradients exceeded by the hydrostatic pressure of the fluid being used to service the wellbore, perforations formed by a perforating gun, and combinations thereof.

The polymeric solution and the activator typically reach the subterranean formation by pumping them down a wellbore that penetrates the formation. The presence of the precipitate barrier in the formation allows fluids known as wellbore servicing fluids to be circulated or squeezed in the wellbore for the purpose of servicing the wellbore without being concerned that a substantial amount of the fluid could flow into and be lost to the formation. FIGS. 1A and 1B illustrate how the precipitate forms a barrier to at least partially reduce the flow of fluid far into a subterranean formation. FIG. 1A depicts a wellbore 10 that has been drilled in the earth such that it penetrates a subterranean formation (not shown). An oil rig 30 positioned near the surface of the earth 20 may be used to recover oil from the formation. A pipe 40 may extend down through wellbore 10 for delivering fluid to and/or from the wellbore. FIG. 1B illustrates a section 50 of wellbore 10 in detail. As illustrated in FIG. 1B, a precipitate 60 forms a solid coating across a flow pathway 70 such as a crack within wellbore 10 and thereby seals flow pathway 70. The larger the quantity of polymer solution pumped into wellbore 10, the thicker the coating formed therein. In an embodiment, the coating may have a thickness ranging from about 1 millimeter to about 10 millimeters, and from about 0.25 to about 0.5 gram/cubic centimeter of precipitate 60 may extend across flow pathway 70. Precipitate 60 is desirably impermeable to fluid and thus inhibits fluid from passing through pathway 70 and deeper into the adjacent subterranean formation. Thus, precipitate 60 serves to reduce the loss of such fluid to the formation, allowing it to be primarily retained within wellbore 10 as it is pumped therethrough.

It is believed that the coating formed by the precipitate will be effective in cracks that are both larger and smaller than the coating thickness near the wall of the wellbore. That is, cracks within the subterranean formation usually decrease in size at greater depths within the formation. Thus, the polymer solution may be pumped into cracks larger than the ensuing coating thickness to a depth where the cracks become sufficiently narrow to allow the coating to plug the entire crack.

In an embodiment, a spacer separates the polymeric solution and the activator as they are being pumped downhole. As used herein, "spacer" is defined as a fluid that prevents the polymeric solution and the activator from interacting with each other as they pass down the wellbore and that is inert with respect to the polymeric solution and the activator. Examples of suitable fluids to use as spacers include natural hydrocarbons, synthetic hydrocarbons, surfactants, glycols, fresh water, and combinations thereof. The amount of the spacer employed in this embodiment may range from about 1 to about 5 barrels or alternatively may be about 2 barrels. In one embodiment, the polymeric solution, the spacer, and the activator are sequentially pumped to the formation. In another embodiment, the activator is pumped first and the polymeric solution is pumped behind the spacer. Within the subterranean formation, the polymeric solution and the activator are no longer separated and thus contact each other, resulting in the formation of the precipitate.

The polymeric solution and the activator may be displaced into the wellbore before or during the circulation/squeezing of a wellbore servicing fluid in the wellbore. In an embodiment, they may be pumped downhole after the discovery that at least a portion of the wellbore servicing fluid is being lost to the subterranean formation. At this point, the circulation/squeezing of the wellbore servicing fluid in the wellbore may be terminated to allow for the formation of the precipitate within the formation. Once the precipitate has been formed, the circulation/squeezing of the fluid in the wellbore may then be resumed. The formation of the precipitate may occur within 1 minute of the initial contact between the polymeric solution and the activator. However, typically one waits for a period of in a range of from about 30 minutes to about 4 hours before passing the wellbore servicing fluid into the wellbore again.

In one embodiment, the precipitate may be used to reduce a pre-completion loss to a subterranean formation. As used herein, a "pre-completion loss" refers to a loss of fluid to a subterranean formation that occurs before the wellbore is completed, i.e., before the annulus of the wellbore has been sealed by a sealant composition, e.g., a cement composition. In an embodiment, the pre-completion loss is the loss of a drilling fluid during its circulation through a wellbore both during and after the drilling of the wellbore. In another embodiment, the pre-completion loss is the loss of a cement slurry (or other type of sealant composition) during primary cementing.

In another embodiment, the precipitate may be used to prevent a post-completion loss to the subterranean formation. As used herein, a "post-completion" loss refers to a loss of fluid to a subterranean formation that occurs after the wellbore is completed, i.e., after the annulus of the wellbore has been sealed by a sealant composition, e.g., a cement composition. In an embodiment, the post-completion loss may be that of a secondary sealant composition such as a cement composition. By way of example, the secondary sealant composition may be placed in one or more permeable zones present in the wellbore using a squeeze technique known in the art. The permeable zones may extend, for example, through the wall of a conduit positioned in the wellbore, a sealant/cement column in the annulus of the wellbore, a microannulus of the wellbore, or combinations thereof. Examples of those permeable zones include a fissure, a crack, a fracture, a streak, a flow channel, a void, and combinations thereof. In yet another embodiment, the post-completion loss may be the loss of a fluid, e.g., a workover fluid, during a production enhancement operation, e.g., a workover operation.

In certain situations, it may be desirable to remove the polymeric precipitate from the subterranean formation. For instance, the precipitate may be removed to prepare the formation for the production of oil, gas, and/or water. That is, the precipitate may be removed to prevent it from blocking the flow of such natural resources from the formation. It may also be removed to avoid contaminating any water produced by the formation. In an embodiment, the precipitate may be removed by dissolving it in a fluid in which it is soluble such as fresh water, thereby providing a simple and inexpensive way to eliminate the precipitate. For example, the precipitate may be removed by water that is initially produced by the formation, or alternatively, it may be removed by water that is intentionally pumped into the wellbore. Examples of compounds that may be employed to dissolve the precipitate include but are not limited to fresh water and brines such as halide brines, e.g., sodium chloride brine.

The methods described above for reducing the loss of a wellbore servicing fluid to the subterranean formation utilize a polymeric solution and an activator. The volume ratio of the polymeric solution to the activator may be in a range of from about 50:50 to about 70:30. The polymeric solution comprises a polymer and a fluid in which the polymer has a relatively high solubility. In embodiments, the polymeric solution may also include but is not limited to lost circulation materials, weighting agents such as barite, acid soluble particles, and combinations thereof. An example of a suitable polymeric solution includes polyvinylpyrrolidone (PVP) in water, which is commercially available from ISP Technologies, Inc. under the tradename of VIVIPRINT 540 solution (10% PVP by weight of the aqueous solution) and from Halliburton Energy Services, Inc. under the tradename of PERFORMATROL polymer (10% PVP by weight of the aqueous solution). The amount of the polymer in the polymeric solution may be a range of from about 1% to about 90%, alternatively from about 5% to about 50%, by weight of the polymeric solution. Examples of suitable activators include formate brines (e.g., potassium formate, sodium formate, and cesium formate), acetate brines (e.g., potassium acetate, sodium acetate, and cesium acetate), oxalate brines (e.g., potassium oxalate, sodium oxalate, and cesium oxalate), halide brines (e.g., zinc bromide), and combinations thereof. In an embodiment, the amount of the potassium formate in the activator may be in a range of from about 10% to about 78%, or alternatively from about 50% to about 78%, by weight of the total formate brine.

Modifications to the Foregoing Embodiments

In an alternative embodiment, the activator may also serve as the solvent in which the polymer is dissolved. The polymer may be coated with a material that prevents it from initially contacting the activator/solvent. Thus, the polymer and the activator may be concurrently pumped downhole without forming a precipitate. The coating may eventually dissolve such that the activator/solvent contacts the polymer and thus forms the precipitate. The period of time required for the coating to completely dissolve may be sufficient to allow the polymer to be pumped into a crack or void in a subterranean formation. As a result, the formation of the precipitate is time delayed.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

Several samples of a PERFORMATROL solution (i.e., the PVP solution) were used in this example. About 16 lbs/gal of barite weighting agent were added to each PERFORMATROL solution sample. The PERFORMATROL solution samples remained pumpable after the addition of the barite weighting agent.

Various potassium formate brines (i.e., the activator) having different densities were combined with respective PERFORMATROL solution samples. The volume ratio of the potassium formate to the PERFORMATROL solution in each sample was 50:50. The densities of the potassium formate brine were 9.8 lb/gal, 10.3 lb/gal, 10.8 lb/gal, 11.7 lb/gal, and 12.2 lb/gal. These particular densities of the potassium formate brines caused a relatively hard PVP precipitate to form. It is believed that potassium formate brines having densities lower than 9.5 lb/gal will not form such a precipitate.

As shown in Table 1 below, various properties of the precipitate formed using the 13.2 lb/gal potassium formate brine were determined. For each mL of PERFORMATROL solution used, approximately 0.4 mL of the potassium formate brine was required to precipitate all of the PVP. The precipitate formed within 1 minute of contacting the PERFORMATROL solution with the formate brine. The sealing capability of the precipitate was determined by placing it on a slotted disk and then placing the disk in a filtration apparatus. A drilling mud was then placed on the disk and an attempt was made to filter the mud through the precipitate by applying a pressure of 500 psi across the disk. The precipitate withstood a 500 psi differential such that no mud could pass through the precipitate at this pressure. The thickness of the seal was measured as ⅛ inch. The precipitate was also heated on a hotplate to determine the temperatures at which it is stable. The precipitate exhibited no apparent decomposition at temperatures less than or equal to 250° F.

TABLE 1

| Precipitate Properties | |
| --- | --- |
| Sealing Capability | 500 psi |
| Thickness | ⅛ inch |
| Rate of formation | <1 min. |
| Temperature Stability | ≦250° F. |

In addition, the lengths of time required to dissolve the precipitate by contacting it with fresh water (placing it in about 100 mL), non-aqueous drilling muds, and halide brines were compared, as presented in Table 2 below. It is noted that ACCOLADE drilling mud is commercially available from Halliburton Energy Services, Inc.

TABLE 2

| Fluid | Time to dissolve |
| --- | --- |
| ACCOLADE base oil | Never dissolved |
| 10.5 lb/gal ACCOLADE mud | Never dissolved |
| Freshwater | 10 minutes |
| Sodium Chloride brine (10 ppg) | 15 minutes |
| Sodium Bromide brine (12.5 ppg) | 2 hours |
| Calcium Chloride brine (11.6 ppg) | 12 hours |
| Calcium Bromide brine (14.2 ppg) | 24+ hours |

Based on Table 2, the precipitate can be dissolved relatively quickly with freshwater or sodium chloride brine. Further, it may also be removed at a relatively slow rate with calcium chloride brine or calcium bromide brine. It is desirably insoluble in the ACCOLADE drilling mud.

Example 2

The procedure followed in Example 1 was repeated with different activators. More specifically, the potassium formate brines were replaced with sodium formate brines, cesium formate brines, and zinc bromide brines. All of those brines caused the PVP to precipitate out of solution.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A wellbore treatment composition comprising:
    a polymeric solution comprising polyvinylpyrrolidone for placement in a wellbore that penetrates a subterranean formation; and
    an activator;
    wherein the volume ratio of the polymer solution to the activator is in the range of from about 50:50 to about 70:30, which is a volume of activator sufficient to cause polyvinylpyrrolidone to precipitate out of the polymeric solution when the polymeric solution and the activator come into contact,
    wherein the activator comprises a formate brine selected from the group consisting of a potassium formate brine, a cesium formate brine, a zinc formate brine, and combinations thereof, and
    wherein the resulting precipitate is capable of at least partially blocking a flow of a wellbore servicing fluid into the subterranean formation.

2. The wellbore treatment composition of claim 1, wherein the wellbore servicing fluid comprises at least one wellbore servicing fluid selected from the group consisting of: a drilling fluid, a cement composition, a workover fluid, and combinations thereof.

3. The wellbore treatment composition of claim 1, wherein an amount of the polymer in the polymeric solution is in a range of from about 1% to about 90% by weight of the polymeric solution.

4. The wellbore treatment composition of claim 1, wherein an amount of formate in the formate brine is in a range of from about 10% to about 78% by weight of the total formate brine.

5. The wellbore treatment composition of claim 1, wherein the precipitate is capable of being dissolved in water for removing the precipitate from the subterranean formation.

6. The wellbore treatment composition of claim 1, being disposed in the wellbore.

7. The wellbore treatment composition of claim 1, being disposed on a truck.

8. The wellbore treatment composition of claim 1, being stored in a warehouse.

9. The wellbore treatment composition of claim 1, wherein a solvent of the polymer comprises the activator, and wherein the polymer is coated with a material that is capable of dissolving as it passes down the wellbore such that contact between the activator and the polymer is time delayed.

10. A wellbore treatment composition comprising:
    a polymeric solution comprising polyvinylpyrrolidone for placement in a wellbore that penetrates a subterranean formation;
    an activator;
    wherein the volume ratio of the polymer solution to the activator is in the range of from about 50:50 to about 70:30, which is a volume of activator sufficient to cause polyvinylpyrrolidone to precipitate out of the polymeric solution when the polymeric solution and the activator come into contact,
    wherein the activator comprises a formate brine,
    wherein the resulting precipitate is capable of at least partially blocking a flow of a wellbore servicing fluid into the subterranean formation; and
    a spacer for separating the polymeric solution and the activator when they are pumped into the wellbore.

11. The wellbore treatment composition of claim 10, wherein the activator comprises at least one activator selected from the group consisting of: a formate brine, an acetate brine, an oxalate brine, a halide brine, and combinations thereof.

12. The wellbore treatment composition of claim 10, wherein the spacer comprises at least one spacer selected from the group consisting of: a natural hydrocarbon, a synthetic hydrocarbon, a glycol, a surfactant, fresh water, and combinations thereof.

13. A wellbore treatment composition comprising:
    a polymeric solution for placement in a wellbore that penetrates a subterranean formation, wherein the polymeric solution comprises polyvinylpyrrolidone in water; and
    an activator;
    wherein the volume ratio of the polymer solution to the activator is in the range of from about 50:50 to about 70:30, which is a volume of activator sufficient to cause polyvinylpyrrolidone to precipitate out of the polymeric solution when the polymeric solution and the activator come into contact,
    wherein the activator comprises at least one activator selected from the group consisting of: a formate brine, an acetate brine, an oxalate brine, zinc bromide brine, and combinations thereof, and
    wherein the resulting precipitate is capable of at least partially blocking a flow of a wellbore servicing fluid into the subterranean formation.

14. The wellbore treatment composition of claim 13, wherein polyvinylpyrrolidone is present in the polymeric solution in an amount in the range of from about 1% to about 90% by weight of the polymeric solution.

15. The wellbore treatment composition of claim 13, wherein an amount of formate in the formate brine is in a range of from about 10% to about 78% by weight of the total formate brine.

16. The wellbore treatment composition of claim 13, wherein the precipitate is capable of being dissolved in water for removing the precipitate from the subterranean formation.

17. The wellbore treatment composition of claim 13, being disposed in the wellbore.

18. The wellbore treatment composition of claim 13, wherein the polyvinylpyrrolidone in the polymeric solution is coated with a material that is capable of dissolving as it passes down the wellbore such that contact between the activator and the polyvinylpyrrolidone is time delayed.

19. The wellbore treatment composition of claim 13, where the polymeric solution further comprises at least one material selected from the group consisting of: a lost circulation material, a weighting agent, an acid soluble particle, and combinations thereof.

* * * * *